May 24, 1949. E. W. N. BOOSEY 2,471,301
CAULKING PLUG
Filed July 20, 1944
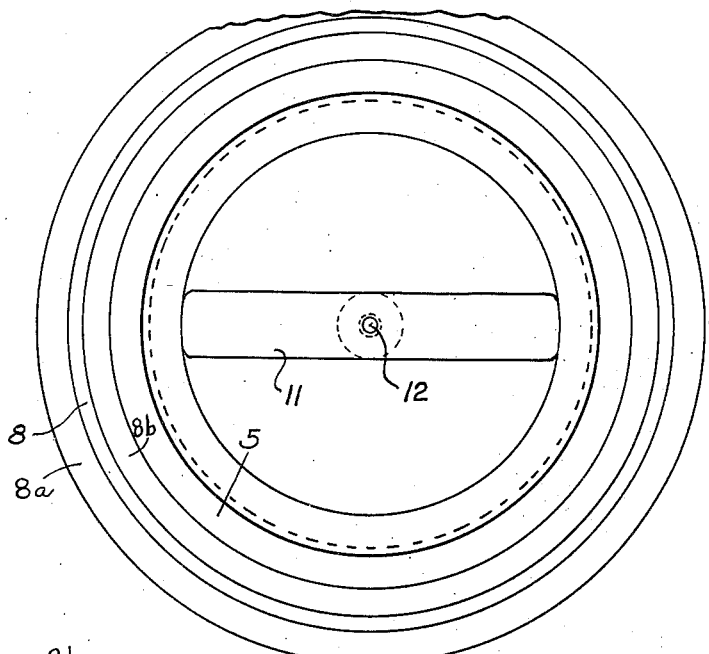
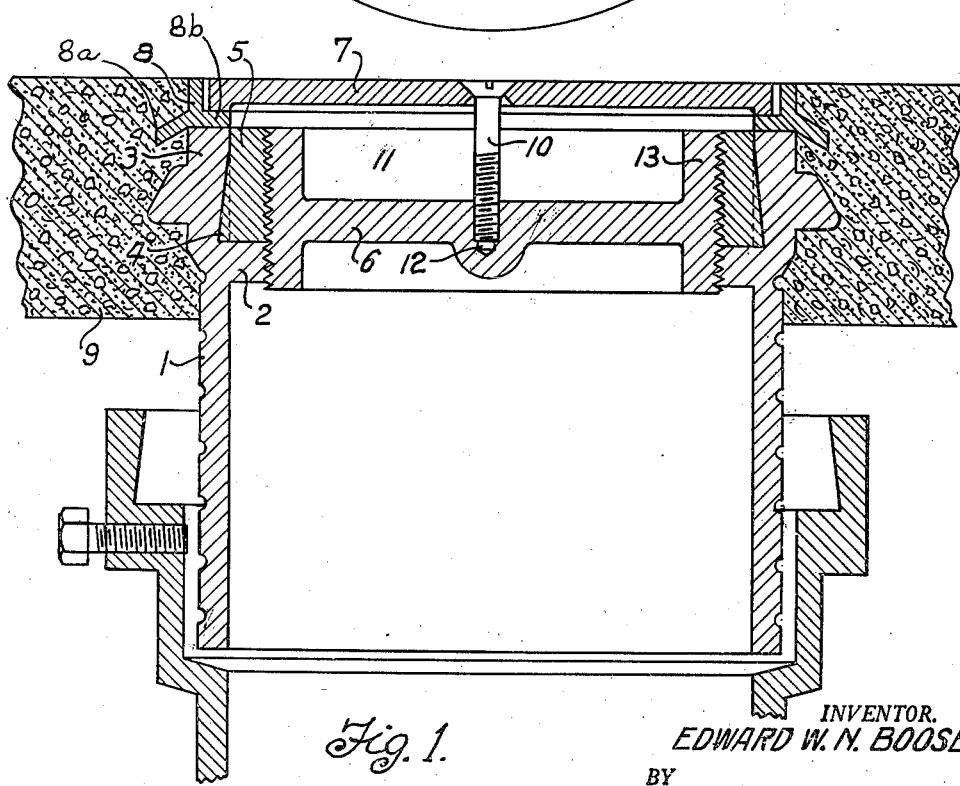
INVENTOR.
EDWARD W. N. BOOSEY.
BY
ATTORNEY.

Patented May 24, 1949

2,471,301

UNITED STATES PATENT OFFICE 2,471,301

CAULKING PLUG

Edward W. N. Boosey, Detroit, Mich.

Application July 20, 1944, Serial No. 545,845

2 Claims. (Cl. 138—89)

This invention relates to caulking plugs for drainage conduits, the purpose being to provide a plug for an opening in a conduit in which it is threaded, the plug being of less diameter than the open end of the conduit thereby providing a caulking space between the exteriorly threaded body of the plug and end of the conduit, means being provided to prevent rotation of the caulking in threading the plug into or out of the conduit.

These and other features and objects of the invention are hereinafter more fully described and claimed and a caulking plug embodying my invention is shown in the accompanying drawing in which—

Fig. 1 is a vertical section showing my improved plug construction including a cover plate.

Fig. 2 is a plan view thereof with the cover plate and support therefor omitted.

In many plumbing installations, as for instance a drainage conduit as shown in Fig. 1, it is necessary to provide lead caulking between the wall of the conduit and the threaded face of the plug. In such former arrangement removal of the plug tends to rotate the caulking with the plug and thus destroy the seal.

In Fig. 1 is shown a conduit 1 having an inwardly extending threaded flange 2 adjacent the upper end 3 which is of greater internal diameter than the diameter of the opening provided by the threaded flange 2.

The inner face of the end 3 of the conduit is provided with a series of grooves 4 and, due to the thickness of the end 3 being less at the point of contact with the flange 2 than at the outer end thereof, the space 5 between the externally threaded face of the plug 6 and the inner face of the end 3 is to be filled with a lead caulking which, in being forced into position between the two assembled parts, causes the caulking to enter the grooves 4 as well as the threaded periphery of the plug 6 which has a threaded cylindrical wall 13.

The grooves 4 are tapered as indicated being of greater depth at the face of the flange 2 than at the outer end thereof. This arrangement permits the plug to be threaded into or out of the opening without displacement of the caulking which is prevented from outward movement due to the lower end of the caulking engaging in the space between the ribs 4 and thus underlies the upper end of the inner face of the end 3. The caulking is also held from rotary movement by the ribs 4.

If the fitting is positioned in a floor, as in the case here shown, a cover plate 7 is provided to rest on a flanged ring 8 set in a concrete floor indicated at 9. A flange 8a of the ring 8 is set in the concrete body 9 and the flange 8b is supported on the upper face of the end 3 of the conduit 1. The cover plate 7 rests upon the upper face of the flange 8b. The plate 7 has a central aperture to receive a screw 10 engageable in a threaded recess provided therefor in the plug 6.

It is to be noted that the plate 7 is positioned flush with the floor surface in the arrangement shown in Fig. 1 but it is to be understood that the device is not limited to use with a vertical conduit as herein described.

The plug is preferably provided with a diametrical recess 11 in its upper surface providing for parallel side walls as will be understood from Fig. 2 and a threaded aperture 12 is provided in the bottom of the recess to receive the screw 10. The recess 11 provides for insertion of a tool having an end practically fitting the side walls of the recess for turning the plug into or out of position which may be accomplished without disturbing the lead caulking. Other means for rotation of the plug may be provided within the scope of the invention as herein claimed.

By the arrangement described the plug can be repeatedly removed and replaced without necessity of re-caulking the same and due to the plug being tapered and in pressure engagement with the caulking material a tight seal is secured in repeated removals of the plug.

It is believed evident from the foregoing that my improved caulking plug is of simple form and accomplishes the objects sought to be attained and that various changes in the form thereof may be made without departing from the spirit and scope of the invention as set forth in the appended claims.

Having thus briefly described my invention, its utility and mode of operation, what I claim and desire to secure by Letters Patent of the United States is:

1. A plumbing fitting comprising in association with a conduit having an open upper end positionable in a floor, an internally and externally flanged ring positioned in the floor at the upper end of the conduit, said conduit having an inwardly extending threaded flange and the inner face of the conduit above the flange having longitudinal grooves of greatest depth at the flange, and means for sealing the upper end of the conduit comprising an externally threaded plug engageable with the internally threaded flange, said plug having means by which it may be rotated to turn the same into or out of its normal position, and a caulking material forced into position between the threaded face of the plug and the grooved surface of the end of the conduit, to thereby provide a threaded surface on the inner face of the caulking thereby permitting the plug to be turned into or from normal position, the grooves in the end of the conduit preventing rotation of the caulking by rotation of the plug in removal thereof, and a cover member seating on the inner flange of the ring, and means for removably securing the cover to the plug.

2. A plumbing fitting comprising in association with a conduit having an open upper end positionable in a floor below the upper surface thereof, an internally and externally flanged ring, the external flange being positioned in the floor and the internal flange resting on the end of the conduit, said conduit having an internally threaded flange extending thereinto, the inner face of the conduit above the internal flange having longitudinal grooves decreasing in depth toward the open end thereof, means for sealing the upper end of the conduit comprising an externally threaded plug engaging the threaded flange, said plug having a diametrical recess in its outer face to receive an implement for turning the plug to or from its desired position, and caulking material in the space between the threaded surface of the plug and the opposed grooved surface of the conduit, said grooved surface of the conduit preventing rotation of the caulking by rotation of the plug.

EDWARD W. N. BOOSEY.

REFERENCES CITED

The following references are of record in the file of this patent:

UNITED STATES PATENTS

| Number | Name | Date |
|---|---|---|
| 694,140 | Crawford | Feb. 25, 1902 |
| 1,277,977 | Mann | Sept. 3, 1918 |
| 1,796,077 | Boosey | Mar. 10, 1931 |

FOREIGN PATENTS

| Number | Country | Date |
|---|---|---|
| 336,015 | Great Britain | Oct. 9, 1930 |